United States Patent
Han et al.

(10) Patent No.: US 11,642,934 B2
(45) Date of Patent: May 9, 2023

(54) VEHICLE AIR CONDITIONER

(71) Applicant: Hanon Systems, Daedeok-gu Daejeon (KR)

(72) Inventors: Seong Seok Han, Daedeok-gu Daejeon (KR); Sung Ho Kang, Daedeok-gu Daejeon (KR); Jeong Eun Lee, Daedeok-gu Daejeon (KR); Jeong Jae Lee, Daedeok-gu Daejeon (KR); Jung Won Cho, Daedeok-gu Daejeon (KR)

(73) Assignee: HANON SYSTEMS, Daedeok-Gu Daejeon (KR)

( * ) Notice: Subject to any disclaimer, the term of this patent is extended or adjusted under 35 U.S.C. 154(b) by 528 days.

(21) Appl. No.: 16/633,986

(22) PCT Filed: Jul. 23, 2018

(86) PCT No.: PCT/KR2018/008255
§ 371 (c)(1),
(2) Date: Jan. 24, 2020

(87) PCT Pub. No.: WO2019/022446
PCT Pub. Date: Jan. 31, 2019

(65) Prior Publication Data
US 2020/0215872 A1 Jul. 9, 2020

(30) Foreign Application Priority Data

Jul. 27, 2017 (KR) .................. 10-2017-0095263
Sep. 29, 2017 (KR) .................. 10-2017-0127767

(51) Int. Cl.
*B60H 1/00* (2006.01)

(52) U.S. Cl.
CPC ..... *B60H 1/00285* (2013.01); *B60H 1/00021* (2013.01); *B60H 1/00521* (2013.01);
(Continued)

(58) Field of Classification Search
CPC ............ B60H 1/00285; B60H 1/00021; B60H 1/00521; B60H 1/00564; B60H 1/00671;
(Continued)

(56) References Cited

U.S. PATENT DOCUMENTS

| 2006/0186224 A1* | 8/2006 | Yoshii | ................ | B60H 1/00378 |
| | | | | 239/548 |
| 2009/0117841 A1* | 5/2009 | Goto | .................. | B60H 1/00064 |
| | | | | 454/127 |

FOREIGN PATENT DOCUMENTS

| JP | H0624236 A | 2/1994 |
| JP | 2009012659 A | 1/2009 |

(Continued)

OTHER PUBLICATIONS

KR-20130067558-A Translation (Year: 2013).*
(Continued)

*Primary Examiner* — David J Teitelbaum
(74) *Attorney, Agent, or Firm* — Dickinson Wright PLLC

(57) ABSTRACT

A vehicle air conditioner is disclosed. The present invention provides the vehicle air conditioner, which: can directly control the amount of air passing through an evaporator and a heater core since a blower is disposed between the evaporator and the heater core; has front and rear seat discharge units respectively having heater cores, thereby having a simple form, minimizing energy consumption, and independently enabling four or more zones, including front and rear seats, the left and right of the front seats, and the left and right of the rear seats, to be air-conditioned; and can discharge an offensive smell to the outside during initial driving of a vehicle since the air outside a vehicle, flowing in from an air inlet, and indoor air flowing in from an inside air suction port, disposed at the center of the vehicle, are discharged to the outside of the vehicle by means of a second blower, and not by a front seat blower, for discharging the air to the rear seats.

11 Claims, 12 Drawing Sheets

(52) U.S. Cl.
    CPC ..... *B60H 1/00564* (2013.01); *B60H 1/00671* (2013.01); *B60H 1/00878* (2013.01); *B60H 2001/002* (2013.01); *B60H 2001/0015* (2013.01)

(58) Field of Classification Search
    CPC ........ B60H 1/00878; B60H 2001/0015; B60H 2001/002
    See application file for complete search history.

(56) References Cited

FOREIGN PATENT DOCUMENTS

| | | | | |
|---|---|---|---|---|
| JP | 2010100139 | A | 5/2010 | |
| KR | 1020110096478 | A | 8/2011 | |
| KR | 20130067558 | A * | 6/2013 | ......... B60H 1/00064 |
| KR | 101445649 | B1 | 9/2014 | |
| KR | 101494720 | B1 | 2/2015 | |
| KR | 20160110890 | A | 9/2016 | |
| KR | 20170040818 | A | 4/2017 | |
| KR | 20170069318 | A | 6/2017 | |

OTHER PUBLICATIONS

International Search Report and Written Opinion dated Oct. 26, 2018 from international Patent Application No. PCT/KR2018/008255 (with English Translation of International Search Report).

* cited by examiner

PRIOR ART

VEHICLE AIR CONDITIONER

CROSS-REFERENCE TO RELATED APPLICATIONS

This application is a National Stage of International Patent Application No. PCT/KR2018/008255, filed Jul. 23, 2018 which claims priority to Korean Patent Application No. KR 10-2017-0095263, filed Jul. 27, 2017 and Korean Patent Application No. KR 10-2017-0127767, filed Sep. 29, 2017. The entire disclosures of each of the above application are incorporated herein by reference.

TECHNICAL FIELD

The present invention relates to an air conditioner for a vehicle, and more particularly, to an air conditioner for a vehicle, which is simple in structure, and can minimize energy consumption, independently perform air-conditioning at the front seat and the rear seat, and discharge unpleasant smell to the outside at the time of initial starting of the vehicle.

BACKGROUND ART

In general, an air conditioner for a vehicle is an apparatus for cooling or heating the interior of the vehicle by cooling or heating through the process of introducing outdoor air into the interior of the vehicle or circulating indoor air of the vehicle. Such an air conditioner for a vehicle includes an evaporator for cooling the inside of an air-conditioning case; a heater core for heating the inside of the air-conditioning case; and a mode converting door for selectively blowing the air cooled by the evaporator or heated by the heater core toward parts of the interior of the vehicle.

According to mounted structures of an air blower unit, an evaporator unit and a heater core unit, such an air conditioner is classified into a three-piece type air conditioner where the air blower unit, the evaporator unit, and the heater core unit are disposed independently, a semi-center type air conditioner where the evaporator unit and the heater core unit are embedded in an air conditioning case and the air blower unit is mounted separately, and a center-mounting type air conditioner where the three units are all embedded in the air conditioning case.

FIG. 1 is a conceptual diagram of a conventional air conditioner for a vehicle. As shown in the drawing, the conventional air conditioner includes: a blower unit 10 including an indoor air inlet 21 and an outdoor air inlet 22, which are formed at one side, an indoor and outdoor air converting door 23 mounted to selectively open and close the indoor air inlet 21 and the outdoor air inlet 22, and a blast fan 35 for forcedly blowing indoor air and outdoor air toward an air inlet 43 of an air-conditioning case 40; and the air-conditioning case 40 having the air inlet 43 for introducing the air blown from the blower unit 10, an air outlet 44 for discharging the air, and an evaporator 41 and a heater core 42 mounted in the air-conditioning case 40 to be spaced apart from each other at a predetermined interval.

Here, the indoor and outdoor air converting door 23 may adopt one of various types, such as a plate type, a dome type which is under little pressure of air, a cylindrical type, and a hemispherical type.

FIG. 2 is a perspective view showing a semi center type air conditioner among the conventional air conditioners. The air conditioner 1 includes: an air-conditioning case 40 having an air inlet 43 formed at an entrance and a plurality of air outlets 44 formed at an exit; and a blower unit 10 for selectively introducing indoor air and outdoor air through an indoor air inlet and an outdoor air inlet 22 formed at an upper part thereof to forcedly blow the air toward the air inlet 43.

The air-conditioning case 40 includes an upper case formed by assembly of a left case and a right case and a lower case assembled to the bottom of the upper case.

Moreover, an evaporator 41 and a heater core (not shown) are mounted inside the air-conditioning case 40 in order, and a temperature adjusting door (not shown) for adjusting temperature and mode doors (not shown) for carrying out various air-conditioning modes are mounted inside the air-conditioning case 40.

Furthermore, the indoor and outdoor air inlets 21 and 22 are communicated with the air inlet 43 of the air-conditioning case 40, and the blast fan 35 is disposed below the indoor and outdoor air inlets 21 and 22. In this instance, the air inlet 43 is formed on the side surface of the air-conditioning case 40.

That is, the blast fan 35 forcedly blows the air introduced from the indoor and outdoor air inlets 21 and 22 to the air inlet 43 formed on the later a surface of the air-conditioning case 40 by rotation. In this instance, a passageway of the air is formed in such a way that the air introduced into the indoor and outdoor air inlets 21 and 22 flows downwardly, passes through the blast fan 35, and is introduced into the air inlet 43 formed on the side surface of the air-conditioning case 40 by rotation of the blast fan 35. That is, the blast fan 35 is disposed below the indoor and outdoor air inlets 21 and 22, and the air-conditioning case 40 is disposed next to the blower unit 10 to communicate with the blower unit 10.

According to the air conditioner 1, the air blown to the inside of the air-conditioning case 40 by operation of the blower unit 10 passes the evaporator 41, and is cooled or heated while selectively passing the heater core 42 by the temperature adjusting door. As described above, the cooled or heated air is supplied to the interior of the vehicle through ducts (not shown) connected with a plurality of air outlets 44 to cool or heat the interior of the vehicle.

Meanwhile, an autonomous vehicle is a vehicle to automatically drive to be capable of performing a typical transporting function. The autonomous vehicle detects circumstances around the vehicle without human intervention, and can do autonomous navigation driving. Now, there are prototypes of a vehicle driven by a robot. Such an autonomous vehicle includes a sensing means, such as a radar, an LIDAR, a GPS, and a computer vision in order to sense circumstances around the vehicle. A more advanced sensing means can interpret not only a route of the corresponding navigation but also a distinguishing means, such as signs related with obstacles.

Additionally, the autonomous vehicle can automatically renew a map according to input of a sensor in order to maintain the route even under unregistered circumstances or under situations with changed conditions. All of the structures make it possible not for a man but for a computer to synthetically judge and actually control and drive a vehicle driving device.

In case of such autonomous vehicles capable of unmanned driving, a driver may not sit on the front seat, or the front seat may face the rear side. In this instance, if it is needed to discharge cold or warm air up to the front seat in order to discharge cold or warm air to the rear seat, such autonomous vehicles have a disadvantage in that energy efficiency is deteriorated.

Because new technologies related with such autonomous vehicles have emerged, new technologies must be applied to the air conditioners installed inside the autonomous vehicles in order to give convenience for passengers. Since introduction and available time of the autonomous vehicles approach, introduction of air conditioners coping with changes in the interiors of vehicles is required. In addition, such autonomous vehicles lack the requisite skills for rapidly removing bad smells generated from the evaporator and quickly ventilating indoor air at the time of initial starting.

DISCLOSURE

Technical Problem

Accordingly, the present invention has been made in view of the above-mentioned problems occurring in the prior art, and it is an object of the present invention to provide an air conditioner for a vehicle, which can directly control an amount of air passing through an evaporator and a heater core since a blower is arranged between an evaporator and a heater core, and which is simple in structure, and can minimize energy consumption and independently carry out air-conditioning relative to a plurality of areas including the front seat and the rear seat due to a front seat discharge unit having the heater core and a rear seat discharge unit having the heater core.

It is another object of the present invention to provide an air conditioner for a vehicle, which includes a front seat blower for discharging air to the front seat and a second blower for discharging air to the rear seat so that outdoor air of the vehicle introduced from an air inlet and indoor air introduced from an indoor air intake arranged at the center of the vehicle can discharge unpleasant smell to the outside not by the front seat blower but by the second blower at the time of initial starting of the vehicle.

Technical Solution

To accomplish the above object, according to the present invention, there is provided an air conditioner for a vehicle including a first unit and a second unit, wherein the first unit has an air inlet and a heat exchanger, the second unit communicates with the first unit and has a blower disposed therein, the air introduced from the air inlet is inhaled to the second unit after passing through the heat exchanger, a discharge duct is disposed to discharge the inhaled air to a plurality of areas in the interior of the vehicle, and the air-conditioned air passing through the heat exchanger is selectively discharged to the plurality of areas to individually perform air-conditioning in the plurality of areas.

Moreover, the plurality of areas include discharge units, which communicate with the second unit by discharge ducts and selectively blow the air blown from the blower, the first unit includes a heating heat exchanger disposed therein, and the discharge unit has a heating heat exchanger disposed therein.

Furthermore, the discharge unit includes: a front seat discharge unit having a front seat heating heat exchanger disposed therein and a front seat air outlet for discharging the air passing through the front seat heating heat exchanger; and a rear seat discharge unit having a rear seat heating heat exchanger disposed therein and a rear seat air outlet for discharging the air passing through the rear seat heating heat exchanger, wherein the air introduced into the air inlet is discharged to a front seat left temperature adjusting door through the front seat heating heat exchanger or discharged to a rear seat right temperature adjusting door through the rear seat heating heat exchanger after passing through the cooling heat exchanger and the blower.

Additionally, the front seat discharge unit includes: a front seat left outlet and a front seat right outlet for discharging wind to the interior of the vehicle; a front seat left temperature adjusting door disposed at one side of the front seat heating heat exchanger to adjust temperature of wind discharged to the front seat left outlet; and a front seat right temperature adjusting door disposed at one side of the front seat heating heat exchanger to adjust temperature of wind discharged to the front seat right outlet.

In addition, the rear seat discharge unit includes: a rear seat left outlet and a rear seat right outlet for discharging wind to the interior of the vehicle; a rear seat left temperature adjusting door disposed at one side of the rear seat heating heat exchanger to adjust temperature of wind discharged to the rear seat left outlet; and a rear seat right temperature adjusting door disposed at one side of the rear seat heating heat exchanger to adjust temperature of wind discharged to the rear seat right outlet.

Moreover, the air conditioner for a vehicle according to the present invention further includes a separation means for dividing the wind blown to the plurality of discharge units.

Furthermore, the air inlet of the first unit includes an indoor air inlet which is an inlet for inhaling the indoor air of the vehicle, an outdoor air inlet which is an inlet for inhaling the outdoor air of the vehicle, and an indoor and outdoor air door disposed at one side to selectively introduce the indoor air or the outdoor air of the vehicle.

Additionally, the first unit may include an air filter arranged between the air inlet and the cooling heat exchanger to remove foreign matters.

In addition, the first unit may include a condensate water drain for preventing leakage of condensate water dropping from the cooling heat exchanger and drain the condensate water to the outside smoothly.

Moreover, the second unit includes an air blast adjusting door for adjusting the degree of opening of a passageway to blow air to the plurality of discharge units.

Furthermore, a plurality of the blowers are disposed corresponding to the discharge ducts to blow air to the plurality of discharge ducts.

Additionally, the plurality of areas communicate with each other by the second unit and the discharge duct, the first unit has a cooling heat exchanger disposed therein, and the discharge unit has a heating heat exchanger disposed therein.

In addition, the air conditioner according to the present invention may include a separation means for dividing the wind blown to the plurality of discharge units.

Moreover, the separation means may be arranged to be spaced apart from the cooling heat exchanger so that the cold air passing through the cooling heat exchanger is mixed and arrives at the separation means.

Furthermore, the plurality of discharge units may include adjusting doors for adjusting the air blown to the plurality of discharge units.

Additionally, the discharge units include: a front seat discharge unit having a front seat heating heat exchanger disposed therein and a front seat air outlet for discharging the air passing through the front seat heating heat exchanger; a rear seat discharge unit having a rear seat heating heat exchanger disposed therein and a rear seat air outlet for discharging the air passing through the rear seat heating heat exchanger; a blower for inhaling air from the first unit and blowing wind to the front seat discharge unit; and a second blower for inhaling air from the first unit and blowing wind to the rear seat discharge unit.

In addition, a front seat adjusting door is disposed at one side of the blower to block the wind introduced into the blower, and a rear seat adjusting door is disposed at one side of a rear seat vent to block the wind introduced into the second blower.

Moreover, the front seat discharge unit includes: a front seat left outlet and a front seat right outlet for discharging wind to the interior of the vehicle; a front seat left temperature adjusting door disposed at one side of the front seat heating heat exchanger to adjust temperature of wind discharged to the front seat left outlet; and a front seat right temperature adjusting door disposed at one side of the front seat heating heat exchanger to adjust temperature of wind discharged to the front seat right outlet.

Furthermore, the rear seat discharge unit includes: a rear seat left outlet and a rear seat right outlet for discharging wind to the interior of the vehicle; a rear seat left temperature adjusting door disposed at one side of the rear seat heating heat exchanger to adjust temperature of wind discharged to the rear seat left outlet; and a rear seat right temperature adjusting door disposed at one side of the rear seat heating heat exchanger to adjust temperature of wind discharged to the rear seat right outlet.

Additionally, the discharge unit includes a PTC heater disposed therein, communicates with the first unit, and further includes a blower and a heater control unit for controlling the PTC heater.

In addition, the discharge units include: a front seat discharge unit having a front seat PTC heater disposed therein and a front seat air outlet for discharging the air passing through the front seat PTC heater; a rear seat discharge unit having a rear seat PTC heater disposed therein and a rear seat air outlet for discharging the air passing through the rear seat PTC heater; a blower for inhaling the air from the first unit and blowing wind to the front seat discharge unit; and a second blower for inhaling air from the first unit and blowing wind to the rear seat discharge unit along the rear seat vent.

Moreover, the rear seat vent is arranged at the floor of the interior of the vehicle, and an indoor air intake is formed at one side thereof.

Furthermore, the air conditioner for a vehicle according to the present invention further includes a communication vent which makes the wind passing through the blower pass through the rear seat discharge unit.

Additionally, the communication vent includes a communication vent door for adjusting the degree of opening of the communication vent.

In another aspect of the present invention, there is provided an air conditioner according for a vehicle, which includes an indoor and outdoor air inlet, a front seat air outlet and a rear seat air outlet, including: a front seat blower for discharging air to the front seat air outlet; a second blower for discharging air to the rear seat air outlet; and a discharge hole for discharging air of a downstream side to the outside of the vehicle by the second blower.

Moreover, the air conditioner further includes: an auxiliary indoor air intake arranged between the front seat blower and the second blower to introduce the inside air of the vehicle; and a rear seat vent arranged at the floor of the vehicle to introduce air from the indoor and outdoor air inlet and/or the auxiliary indoor air intake, and communicating with the rear seat air outlet and the discharge hole.

Furthermore, the air conditioner further includes: a control unit for selectively controlling the front seat blower or the second blower to operate the front seat blower when a passenger sits on a front seat sheet and to operate the second blower when the passenger sits on a rear seat sheet.

Additionally, the air conditioner further includes: a front seat adjusting door disposed at one side of the front seat blower to open and close a flow of air toward the front seat air outlet; and a rear seat adjusting door disposed at one side of the second blower to open and close a flow of air toward the rear seat air outlet.

In addition, the indoor and outdoor air inlet includes an indoor air inlet and an outdoor air inlet, an opening and closing door is disposed at one side of the discharge hole to open and close the discharge hole. In order to ventilate the interior of the vehicle, the front seat adjusting door is closed and the indoor air intake is opened, the opening and closing door is opened, and the second blower is operated, so that the outside air of the vehicle introduced from the outdoor air inlet and/or the inside air of the vehicle introduced from the indoor air intake can be discharged to the discharge hole by the second blower.

Moreover, the air conditioner further includes: a first unit having an indoor and outdoor air inlet and a cooling heat exchanger; a second unit having a front seat adjusting door for opening and closing a flow of air toward the front seat blower, the second blower and the front seat air outlet and a rear seat adjusting door for opening and closing a flow of air toward the rear seat air outlet; a front seat discharge unit communicating with the second unit and having a front seat heating heat exchanger and the front seat air outlet; and a rear seat discharge unit communicating with the second unit and having a rear seat heating heat exchanger and the rear seat air outlet.

Furthermore, the air conditioner for a vehicle further includes: an air-conditioning case in which the cooling heat exchanger of the first unit, the front seat blower of the second unit, the front seat heating heat exchanger and the front seat air outlet of the front seat discharge unit are disposed, wherein the front seat blower is arranged between the cooling heat exchanger and the front seat heating heat exchanger.

Additionally, the first unit includes a first exit communicating with the second unit, and a second exit communicating with the rear seat vent and formed below the first exit.

In addition, the second blower communicates with the rear seat vent and is arranged at the rear of the vehicle, and the rear seat discharge unit is arranged at the rear of the vehicle and discharges the air introduced by the second blower to the rear seat air outlet.

Advantageous Effects

As described above, the air conditioner for a vehicle according to an embodiment of the present invention can directly control an amount of air passing through the evaporator and the heater core since the blower is arranged between the evaporator and the heater core. Therefore, the air conditioner for a vehicle according to the present invention can solve the problem of the conventional air conditioners have difficulty in directly controlling an amount of air introduced into the heater core since the air, which passed through the evaporator by the blower, passes through the heater core.

Moreover, the air conditioner for a vehicle according to the embodiment of the present invention can utilize the interior space of the vehicle by remarkably reducing the volume of the air conditioner since the evaporator unit in which the evaporator is arranged, the front seat discharge unit in which the front seat heater core is arranged, and the rear seat discharge unit in which the rear seat heater core is arranged are distinct from one another.

Furthermore, the air conditioner for a vehicle according to the embodiment of the present invention can save energy since one blower can individually discharge cold air/warm air relative to all seats.

Additionally, the air conditioner for a vehicle according to the embodiment of the present invention can carry out air-conditioning according to all conditions through a simple structure and save energy greatly since having a communication vent through which wind passing through the blower can pass through the rear seat discharge unit.

In addition, the air conditioner for a vehicle according to the embodiment of the present invention can independently blow cold air or warm air to the front seat and the rear seat by blowing wind toward the front seat discharge unit by the blower and by blowing wind toward the rear seat discharge unit by the second blower.

Moreover, the air conditioner for a vehicle according to another embodiment of the present invention can be simplified in structure since having the PTC heater controlled by a heater control unit and not requiring front seat and rear seat right and left temperature adjusting doors.

Furthermore, the air conditioner for a vehicle according to the embodiment of the present invention can discharge the indoor air introduced into the interior of the vehicle through the indoor air intake and bad smell generated from the cooling heat exchanger like the evaporator or generated from the inside of the air-conditioning case to the outside of the vehicle through the air outlets.

Additionally, the air conditioner for a vehicle according to the embodiment of the present invention can directly control the amount of air passing through the cooling heat exchanger and the front seat and rear seat heating heat exchangers since the blower is arranged between the cooling heat exchanger and the heating heat exchanger.

In addition, the air conditioner for a vehicle according to the embodiment of the present invention can utilize the interior space of the vehicle by remarkably reducing the volume of the air conditioner not because the cooling heat exchanger and the heating heat exchanger are arranged in one unit but because the unit in which the cooling heat exchanger is arranged and the unit in which the front seat heating heat exchanger is arranged are distinct from each other.

EXPLANATION OF REFERENCE NUMERALS

Figure 1:
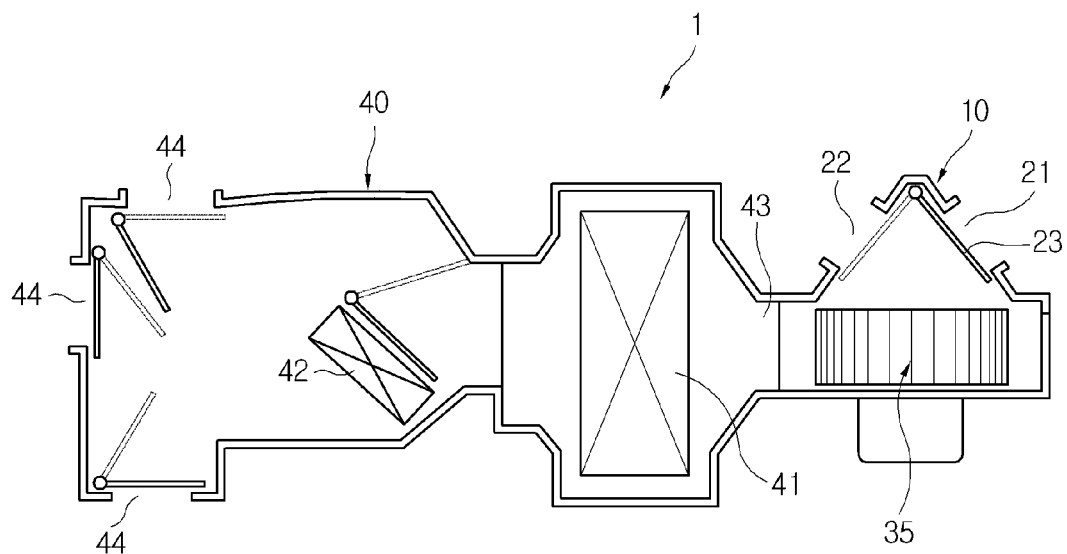
FIG. 1 is a conceptual diagram of a conventional air conditioner for a vehicle.
Figure 2:
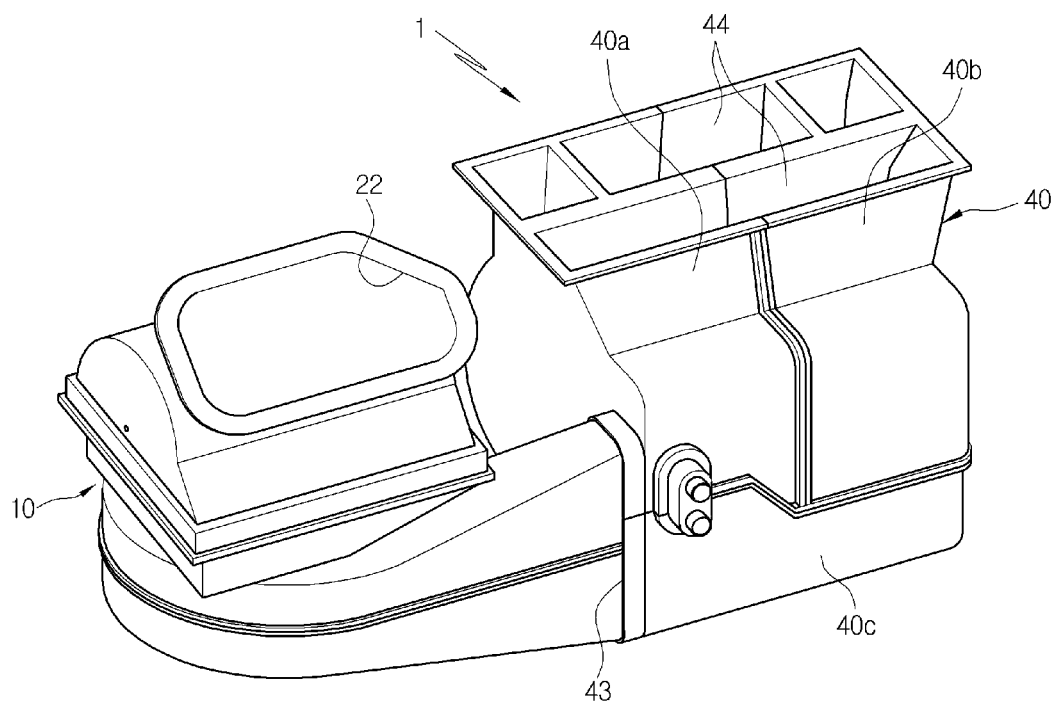
FIG. 2 is a perspective view showing the conventional air conditioner for a vehicle.

100: vehicle air conditioner 110: air-conditioning case
120: front seat sheet 130: rear seat sheet
200: first unit 210: indoor air inlet
211: outdoor air inlet 220: air inlet
230: cooling heat exchanger 240: air filter
250: first exit 260: second exit
300: second unit 310: blower
311: front seat adjusting door 312: separation means
320: air blast adjusting door 330: second blower
340: rear seat vent 341: rear seat adjusting door
350: indoor air intake 360: front seat blower
370: auxiliary indoor air intake 380: rear seat outlet
400: front seat discharge unit
410: front seat heating heat exchanger
411: front seat left temperature adjusting door
412: front seat right temperature adjusting door
420: front seat air outlet 421: front seat left outlet
422: front seat right outlet 423: right seat roof outlet
424: right side outlet 425: defrost outlet
426: left side outlet 427: left roof outlet
430: front seat temperature adjusting door
450: front seat mode door
490: communication vent 491: communication vent door
500: rear seat discharge unit
510: rear seat heating heat exchanger
511: rear seat left temperature adjusting door
512: rear seat right temperature adjusting door
520: rear seat air outlet 521: rear seat left outlet
522: rear seat right outlet
530: rear seat temperature adjusting door
540: discharge hole 541: opening and closing door
550: rear seat mode door 600: roof vent
610: roof outlet 700: rear seat roof vent
710: rear seat roof outlet 800: defrost vent
810: defrost outlet 820: central outlet
900: heater control unit

MODE FOR INVENTION

In order to fully understand the present invention, exemplary embodiments of the invention will be described with reference to the accompanying drawings. The embodiments of the present invention may be modified in many different forms and the scope of the invention should not be limited to the embodiments set forth herein. Rather, these embodiments are provided so that this disclosure will be thorough and complete, and will fully convey the concept of the invention to those skilled in the art. In the drawings, the shapes and dimensions may be exaggerated for clarity, and the same reference numerals will be used throughout to designate the same or like components. A detailed explanation of known related functions and constitutions may be omitted to avoid unnecessarily obscuring the subject matter of the present invention.

Figure 3:
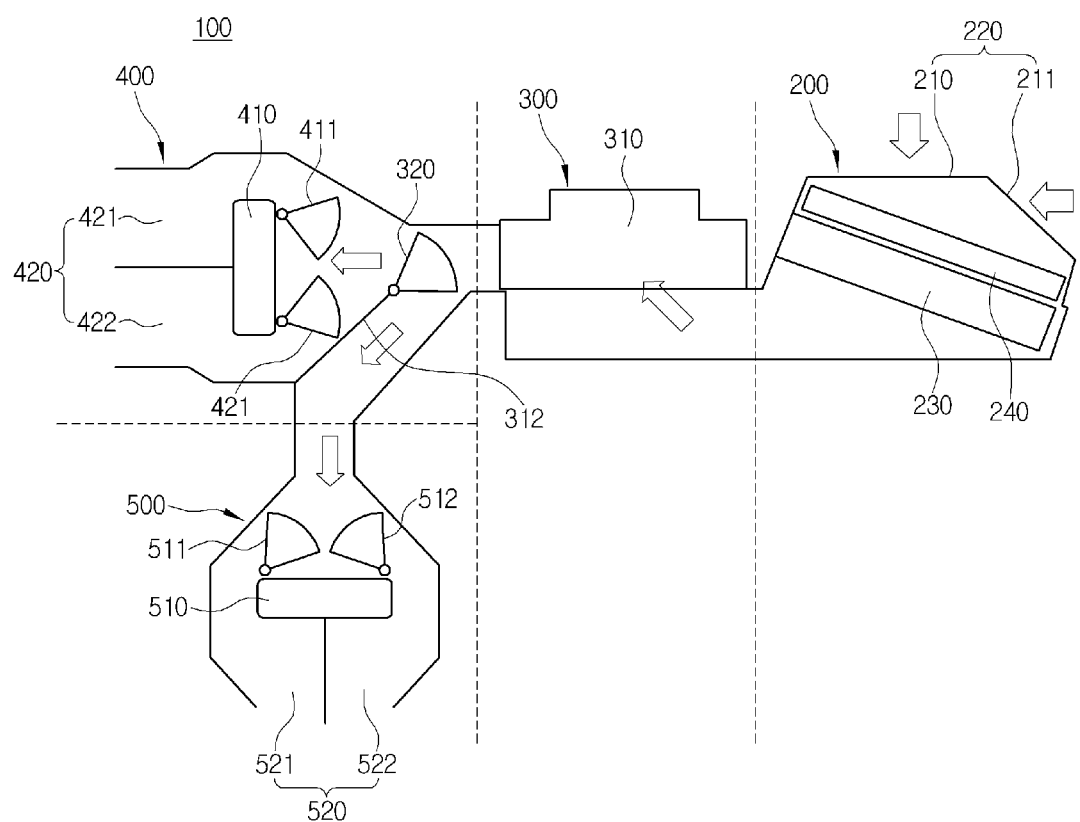
FIG. 3 is a schematic diagram showing an air conditioner for a vehicle according to a first preferred embodiment of the present invention.

FIG. 3 is a schematic diagram showing an air conditioner for a vehicle according to a first preferred embodiment of the present invention.

As shown in FIG. 3, the air conditioner 100 for a vehicle according to the preferred embodiment of the present invention includes: a first unit 200, which includes an air inlet 220 having an indoor air inlet 210 and an outdoor air inlet 211 and a cooling heat exchanger 230 disposed in the first unit 200; a second unit 300 communicating with the first unit 200 and having an air blower 310 disposed therein; a front seat discharge unit 400 communicating with the second unit 300 and including a front seat heating heat exchanger 410 disposed therein and a front seat air outlet 420 for discharging the air passing the front seat heating heat exchanger 410; and a rear seat discharge unit 500 communicating with the second unit 300 and including a rear seat heating heat exchanger 510 disposed therein and a rear seat air outlet 520 for discharging the air passing the rear seat heating heat exchanger 510.

In this embodiment, differently from the conventional air conditioner that indoor air or outdoor air passes through the blower, the evaporator and the heater core in order and is discharged to the interior of the vehicle, the blower 310 is arranged between the cooling heat exchanger 230 and the heating heat exchangers 410 and 510 so that indoor air or outdoor air passes through the cooling heat exchanger 230, the blower 310 and the heating heat exchangers 410 and 510 in order and is discharged to the interior of the vehicle.

In this invention, the heating heat exchanger is disposed in a discharge unit, but the heating heat exchanger may be a heater core for emitting heat or may be a PTC heater which will be described later. Likewise, the cooling heat exchanger may be an evaporator for absorbing heat by refrigerant circulating in the vehicle.

The conventional air conditioner has a problem in that it is difficult to directly control an amount of air introduced into the heater core 410 since the air which passed through the evaporator by the blower passes through the heater core, but the air conditioner for a vehicle according to the present invention can directly control an amount of air passing through the cooling heat exchanger 230 and the heater cores 410 and 510 since the blower 310 is arranged between the cooling heat exchanger 230 and the heater core 410.

Moreover, differently from the conventional air conditioner that the cooling heat exchanger and the heating heat exchanger occupy a wide space since being arranged in one unit side by side, the air conditioner according to this embodiment of the present invention can utilize the interior space of the vehicle due to a remarkably reduced volume of the air conditioner since the first unit 200 in which the cooling heat exchanger 230 is arranged, the front seat discharge unit 400 in which the front seat heating heat exchanger 410 is arranged, and the rear seat discharge unit 500 in which the rear seat heating heat exchanger 510 is arranged are distinct from one another.

Furthermore, the air conditioner for a vehicle according to this embodiment of the present invention can save energy since individually discharging cold air or warm air relative to all seats using just one blower 310. For instance, according to sitting locations of passengers, if a passenger sits at the right of the rear seat of an autonomous vehicle, the one blower 310 can independently discharge wind just to the right side of the rear seat or simultaneously or selectively discharge wind to the front seat and the rear seat.

The cooling heat exchanger 230 is arranged in the first unit 200, and the air inlet 220 including the indoor air inlet 210, which is an inlet for inhaling indoor air of the vehicle, or the outdoor air inlet 211, which is an inlet for inhaling outdoor air of the vehicle, is formed at one side of the first unit 200. An indoor and outdoor air door (not shown) for selectively introducing indoor air or outdoor air may be disposed at one side of the air inlet 220.

Furthermore, the first unit 200 has an air filter 240 disposed between the air inlet 220 and the cooling heat exchanger 230 in order to remove foreign matters. Additionally, because the cooling heat exchanger 230 is arranged in the first unit 200, condensate water discharge hole (not shown) may be disposed on the bottom of the first unit 200 to prevent leakage of condensate water dropping from the cooling heat exchanger 230 and to drain the condensate water to the outside smoothly.

The blower 310 is disposed in the second unit 300 in order to selectively or simultaneously blow the air introduced from the first unit 200 to the front seat discharge unit 400 and the rear seat discharge unit 500. In this instance, a controller (not shown) can directly control an amount of air blown to the discharge units 400 and 500.

The blower 310 of the second unit 300 includes a scroll case in which a blast fan for forcedly blowing air toward the discharge units 400 and 500 is mounted. That is, the blower 310 has the same structure as the conventional blower, but is arranged between the first unit 200 and the discharge units 400 and 500 in the present invention.

The front seat and rear seat discharge units 400 and 500 communicate with the second unit 300 to introduce the air blown from the blower 310, and the air blast adjusting door 320 for adjusting the degree of opening of a passageway for blowing the air to the front seat discharge unit 400 or the rear seat discharge unit 500 is disposed at the end of the second unit 300.

The front seat discharge unit 400 includes: a front seat left outlet 421 and a front seat right outlet 422 which are outlets for discharging wind to the interior of the vehicle; a front seat left temperature adjusting door 411 for adjusting temperature of the air discharged to the front seat left outlet 421; and a front seat right temperature adjusting door 412 for adjusting temperature of the air discharged to the front seat right outlet 422, wherein the front seat left temperature adjusting door 411 and the front seat right temperature adjusting door 412 are disposed at one side of the front seat heating heat exchanger 410.

Likewise, the rear seat discharge unit 500 includes: a rear seat left outlet 521 and a rear seat right outlet 522; a rear seat left temperature adjusting door 511 for adjusting temperature of the air discharged to the rear seat left outlet 521; and a rear seat right temperature adjusting door 512 for adjusting temperature of the air discharged to the rear seat right outlet 522, wherein the rear seat left temperature adjusting door 511 and the rear seat right temperature adjusting door 512 are disposed at one side of the rear seat heating heat exchanger 510.

Additionally, in the present invention, the discharge units are limited to the front seat discharge unit 400 and the rear seat discharge unit 500, but a plurality of discharge units including the front seat discharge unit 400 and the rear seat discharge unit 500 can discharge the air to a plurality of areas. In this instance, the air introduced from the air inlet 220 of the first unit 200 passes through the cooling heat exchanger 230 by the blower 310, and then is inhaled to the second unit 300. The air inhaled to the second unit 300 can be discharged to the plurality of areas after passing through the discharge unit. A discharge duct is disposed to communicate with the second unit 300 so that the air is discharged to the plurality of areas, and the heating heat exchanger may be disposed at the plurality of areas. After that, the air inhaled to the second unit 300 may be discharged to the interior of the vehicle after passing through the heat exchanger selectively disposed in the plurality of areas.

That is, because the above structure makes it possible to individually perform temperature adjustment, cooling and heating modes, and air volume adjustment in the plurality of areas, the effects may be maximized in the autonomous vehicle.

Hereinafter, an operational process of the air conditioner for a vehicle according to this embodiment will be described.

First, the air introduced into the air inlet 220 of the first unit 200 by the blower 310 is blown to the second unit 300 after passing through the cooling heat exchanger 230. The blower 310 of the second unit 300 blows wind toward the discharge units 400 and 500. In this instance, the blower 310 can control an amount of the air blown toward the front seat discharge unit 400 or the rear seat discharge unit 500 by the air blast adjusting door 320.

That is, the air blast adjusting door 320 for selectively adjusting the wind selectively blown toward the discharge units 400 and 500 is disposed at the rear end of the second unit 300 so that the wind blown from the second unit 300 can be selectively blown to the front seat or the rear seat of the vehicle. For instance, the air blast adjusting door 320 can blow the entire wind to the rear seat or to the front seat by adjusting the degree of opening of the air blast adjusting door 320. Alternatively, the air blast adjusting door 320 may blow 10% of the wind to the front seat as much as needed for defrosting and 90% of the wind to the rear seat to provide the passenger sitting on the rear seat with cold air. In this instance, it is described that the two discharge units are disposed at the front seat and the rear seat, but three or more discharge units may be disposed in forward, rearward, upward, downward and lateral directions. In this instance, a separation means 312 for dividing the wind blown to the plurality of discharge units is provided.

Therefore, the front seat discharge unit 400 includes the front seat left temperature adjusting door 411 or the front seat right temperature adjusting door 412 to discharge cold air or warm air to the front seat left outlet 421 and the front seat right outlet 422 selectively and independently.

For an example, when the passenger who is sitting on the rear seat wants to discharge warm air to the rear seat right outlet 522, the air blast adjusting door 320 blocks the passageway toward the front seat discharge unit 400 and opens the passageway toward the rear seat discharge unit 500. Moreover, the rear seat heating heat exchanger 510 is operated, and the rear seat left temperature adjusting door 511 blocks the passageway but the rear seat air outlet 520 opens the passageway.

For another example, when the passenger who is sitting on the front seat wants to discharge cold air to the front seat left outlet 421, the air blast adjusting door 320 blocks the passageway toward the rear seat discharge unit 500 and opens the passageway toward the front seat discharge unit 400. Moreover, the front seat heating heat exchanger 410 is not operated, and the front seat right temperature adjusting door 412 blocks the passageway but the front seat left temperature adjusting door 411 opens the passageway.

Figure 4:
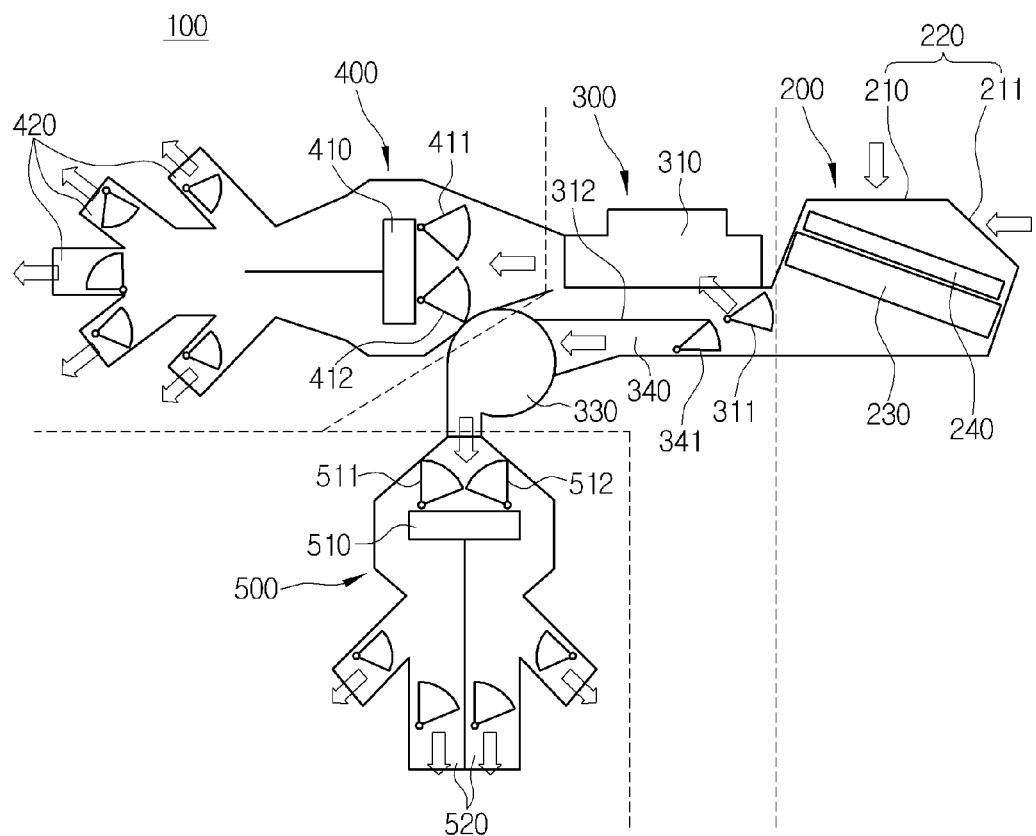
FIG. 4 is a schematic diagram showing an air conditioner for a vehicle according to a second preferred embodiment of the present invention.

FIG. 4 is a schematic diagram showing an air conditioner for a vehicle according to a second preferred embodiment of the present invention.

As shown in FIG. 4, the air conditioner 100 for a vehicle according to this embodiment further includes a second blower 330 without the air blast adjusting door 320 in order to blow wind toward the rear seat discharge unit 500.

In detail, the air conditioner 100 for a vehicle according to this embodiment includes: a first unit 200 including an air inlet 220, which has an indoor air inlet 210 and an outdoor air inlet 211, and a cooling heat exchanger 230 disposed therein; a front seat discharge unit 400 including a front seat heating heat exchanger 410 disposed therein and a front seat air outlet 420 for discharging the air passing through the front seat heating heat exchanger 410; a rear seat discharge unit 500 including a rear seat heating heat exchanger 510 disposed therein and a rear seat air outlet 520 for discharging the air passing through the rear seat heating heat exchanger 510; a second unit 300 including a blower 310 for inhaling the air from the first unit 200 and blowing wind toward the front seat discharge unit 400 and a second blower 330 for inhaling air from the first unit 200 and blowing wind toward the rear seat discharge unit 500; and a separation means 312 for dividing the wind blown toward the plurality of discharge units 400 and 500.

In this embodiment, the air conditioner for a vehicle further includes the second blower 330 for blowing wind toward the rear seat discharge unit 500. Therefore, the second blower 330 blows wind toward the front seat discharge unit 400 and blows wind toward the rear seat discharge unit 500 by the second blower 330.

In this embodiment, for your better understanding, the number of the discharge units are limited to two, namely, the front seat discharge unit 400 and the rear seat discharge unit 500, but, a plurality of discharge units including various discharge paths, namely, the front seat, the rear seat, the central seat, and the lateral surface, may be disposed. In other words, the plurality of discharge units individually include the blowers to respectively blow wind.

Therefore, because cold air passing through one first unit 200 having the cooling heat exchanger 230 can be simultaneously or selectively supplied to the plurality of discharge units, the cooling heat exchanger 230 can get the most use of the cooling heat exchanger 230.

Moreover, the separation means 312 is disposed at the rear end of the first unit 200 to divide the cold air passing through the cooling heat exchanger 230 so that the cold air is individually blown to the plurality of discharge units. For example, the separation means 312 may be a partition wall or a duct for dividing the wind blown to the plurality of discharge units so that the wind is blown selectively. A rear vent 340 may be formed such that the wind flows to the rear seat discharge unit 500 by the separation means 312.

Additionally, a plurality of adjusting doors may be disposed at one side of the separation means 312 depending on the number of the discharge units in order to individually adjust the amount of air blown to the plurality of discharge units. That is, the plurality of adjusting doors can send cold air as much as needed for the plurality of discharge units.

In detail, the blower 310 includes a front seat adjusting door 311 disposed at one side of the blower 310 to adjust the wind introduced into the blower 310 and a rear seat adjusting door 341 disposed at one side of the rear seat vent 340 to adjust the wind introduced into the second blower 330. Therefore, the blower 310 can send cold air as much as needed for the front seat discharge unit 400 or the rear seat discharge unit 500 by the front seat adjusting door 311 or the rear seat adjusting door 341.

In addition, when any one among the blower 310 or the second blower 330 is operated, the front seat adjusting door 311 and the rear seat adjusting door 341 can prevent the wind from being flown from the other blower reversely.

Moreover, in this embodiment, preferably, the cooling heat exchanger 230 and the separation means 312 are arranged to be spaced apart from each other at a predetermined interval so that the cold air passing the cooling heat exchanger 230 is mixed completely and arrives at the separation means 312.

Furthermore, the front seat discharge unit 400 includes: a front seat left outlet 421 and a front seat right outlet 422; and a front seat heating heat exchanger 410 having a front seat left temperature adjusting door 411 and a front seat right temperature adjusting door 412, which are mounted at one side of the front seat heating heat exchanger 410, wherein the front seat left temperature adjusting door 411 adjusts temperature of the air discharged to the front seat left outlet 421 and the front seat right temperature adjusting door 412 adjusts temperature of the air discharged to the front seat right outlet 422. Furthermore, the rear seat discharge unit 500 includes: a rear seat left outlet 521 and a rear seat right outlet 522; and a rear seat heating heat exchanger 510 having a rear seat left temperature adjusting door 511 and a rear seat right temperature adjusting door 512, which are mounted at one side of the rear seat heating heat exchanger 510, wherein the rear seat left temperature adjusting door 511 adjusts temperature of the air discharged to the rear seat left outlet 521 and the rear seat right temperature adjusting door 512 adjusts temperature of the air discharged to the rear seat right outlet 522.

Figure 5:
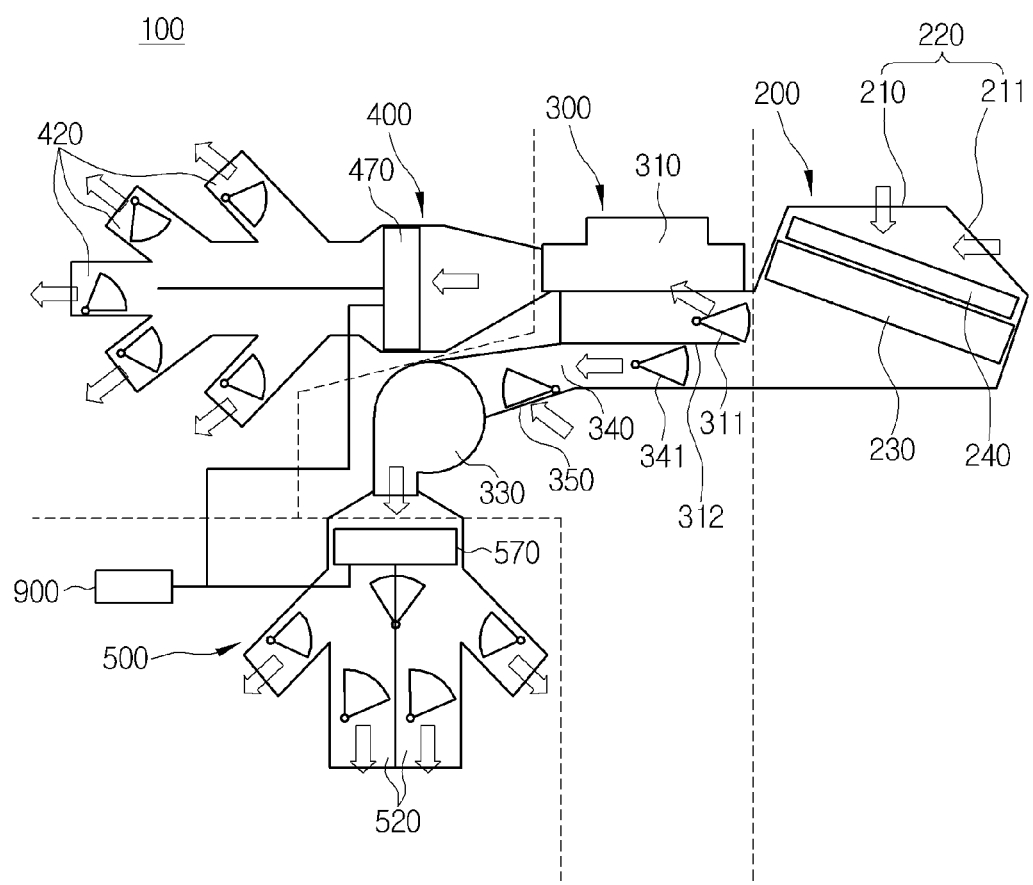
FIG. 5 is a schematic diagram showing an air conditioner for a vehicle according to a third preferred embodiment of the present invention.

FIG. 5 is a schematic diagram showing an air conditioner for a vehicle according to a third preferred embodiment of the present invention.

As shown in FIG. 5, the air conditioner 100 for a vehicle according to this embodiment of the present invention includes a front seat PTC heater (Positive Temperature Coefficient heater) 470 and a rear seat PTC heater 570, which are substituted for the front seat heating heat exchanger 410 and the rear seat heating heat exchanger 510, and a heater control unit 900 disposed at one side of the vehicle to adjust temperature of the air discharged to the front and rear seat air outlets 420 and 520 by directly controlling duty of the PTC heaters 470 and 570.

Therefore, the heater control unit 900 directly controls the heaters 470 and 570 without the front and rear seat right and left temperature adjusting doors 411, 412, 511 and 512, which were disposed at the front end of the heater core.

In detail, the air conditioner 100 for a vehicle according to this embodiment includes: a first unit 200 having an air inlet 220 and a cooling heat exchanger 230 disposed therein; a front seat discharge unit 400 having a front seat PTC heater 470 disposed therein and a front seat air outlet 420 for discharging the air passing through the front seat PTC heater 470; a rear seat discharge unit 500 having a rear seat PTC heater 570 disposed therein and a rear seat air outlet 520 for discharging the air passing through the rear seat PTC heater 570; a second unit 300 having a blower 310 for inhaling air from the first unit 200 and blowing wind to the front seat discharge unit 400, and a second blower 330 for inhaling air from the first unit 200 and blowing wind to the rear seat discharge unit 500 along a rear seat vent 340; and the heater control unit 900 for controlling the front seat PTC heater 470 and the rear seat PTC heater 570.

Additionally, in this embodiment, the rear seat vent 340 may be arranged at the floor of the interior of the vehicle, and an indoor air intake 350 may be formed at one side of the rear seat vent 340. Therefore, in a heating mode, when the indoor air intake 350 is opened, because the air in the interior of the vehicle directly goes to the PTC heater 570 without passing through the cooling heat exchanger 230, the interior of the vehicle can be heated rapidly.

Figure 6:
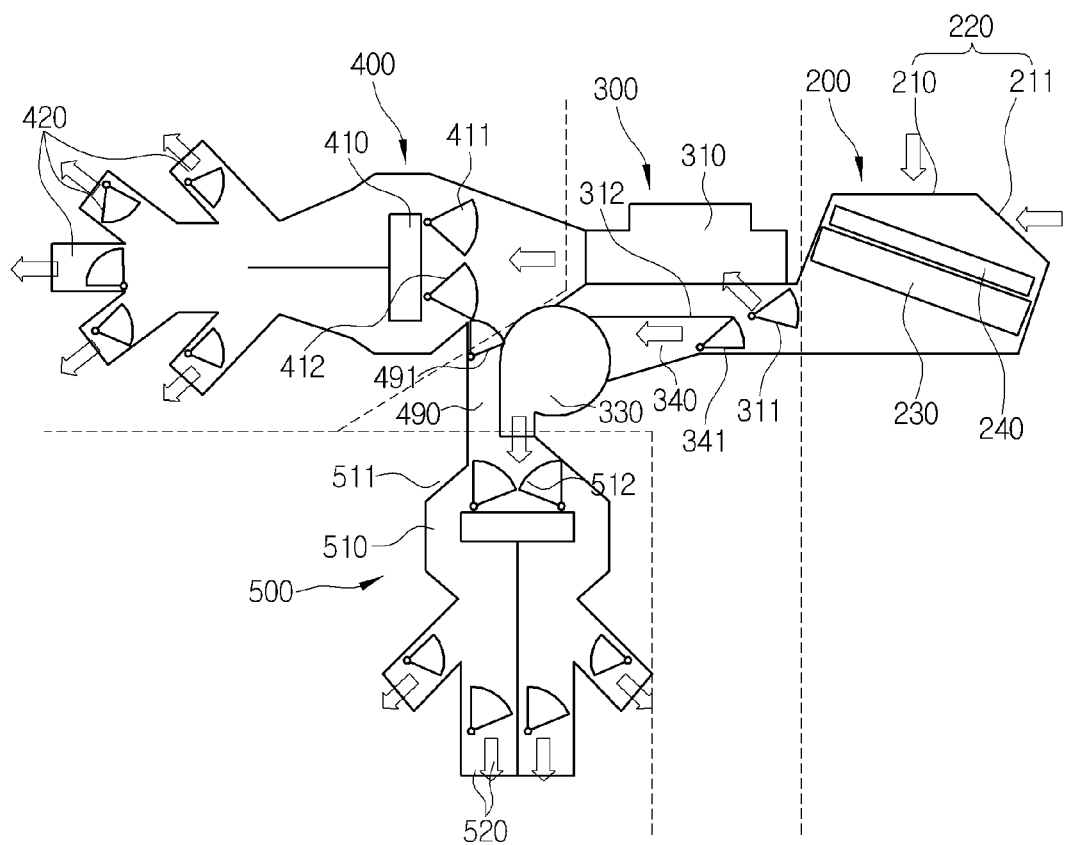
FIG. 6 is a schematic diagram showing an air conditioner for a vehicle according to a fourth preferred embodiment of the present invention.

FIG. 6 is a schematic diagram showing an air conditioner for a vehicle according to a fourth preferred embodiment of the present invention.

As shown in FIG. 6, the air conditioner 100 for a vehicle according to this embodiment further includes a communication vent 490 so that the wind passing through the blower 310 can goes through the rear seat discharge unit 500. That is, the blower 310 can blow the air to the front seat discharge unit 400 and the rear seat discharge unit 500 at the same time, and the wind can be introduced into the rear seat discharge unit 500 from the blower 310 and the second blower 330.

In addition, the communication vent 490 includes a communication vent door 491 for adjusting the degree of opening of the communication vent 490. Here, in FIG. 6, it is illustrated that the communication vent 490 communicates with the rear seat discharge unit 500 before the air passes through the front seat heating heat exchanger 410, but this embodiment is not restricted to the above.

If a passenger sits just on the rear seat of the autonomous vehicle, the second blower 330 is not used, and only the blower 310 is used to discharge cold air to the front seat and cold air or warm air to the rear seat. Moreover, if the autonomous vehicle has two or more arrays of the rear seat, the blower 310 and the second blower 330 are used at the same time to strongly blow cold air to the rear seat.

Especially, energy saving in the autonomous vehicle is very important. According to this embodiment, the air conditioner for a vehicle can save energy greatly when window defogging of the front seat is needed in the state where the passenger is sitting just on the rear seat, and individually carry out air-conditioning according to all conditions through the simple structure.

Figure 7:
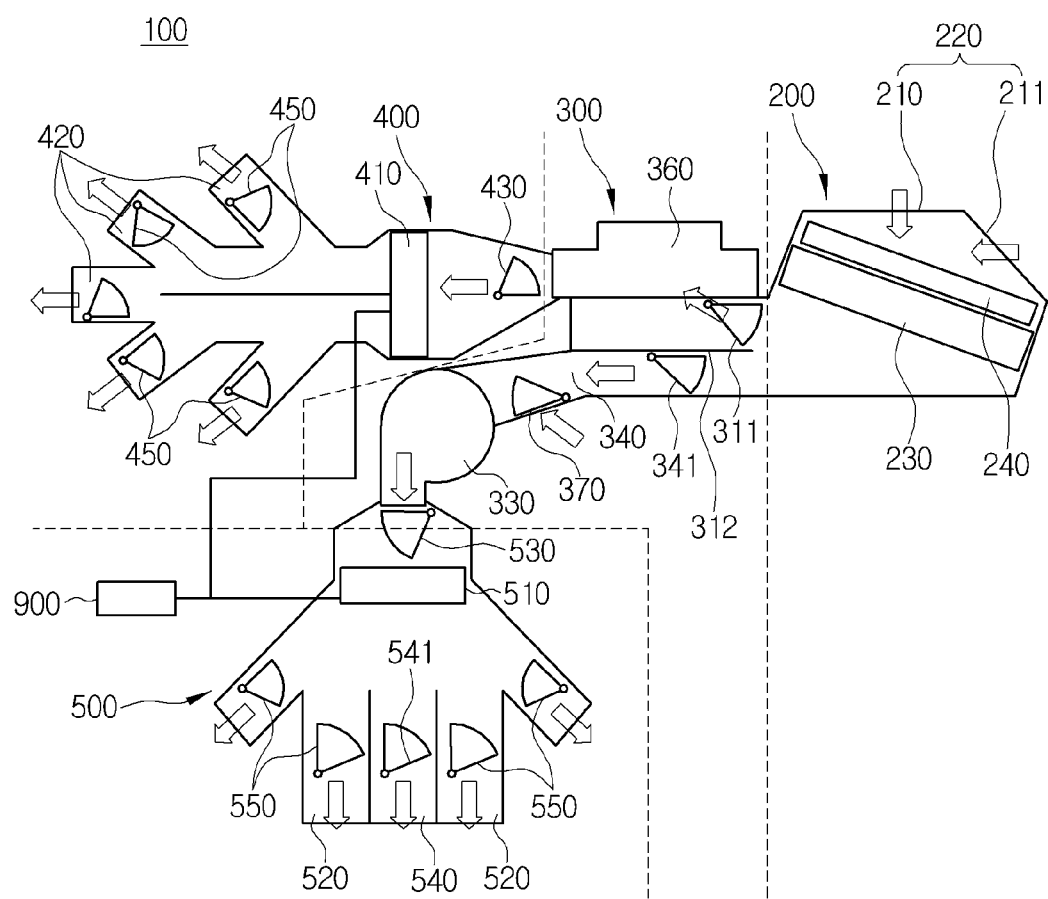
FIG. 7 is a schematic diagram showing an air conditioner for a vehicle according to a fifth preferred embodiment of the present invention.

FIG. 7 is a schematic diagram showing an air conditioner for a vehicle according to a fifth preferred embodiment of the present invention.

As shown in FIG. 7, the air conditioner 100 for a vehicle according to this embodiment includes: a first unit 200 including an indoor and outdoor air inlet 220, which has an indoor air inlet 210 and an outdoor air inlet 211, and a cooling heat exchanger 230 disposed therein; a second unit 300 including a plurality of blowers for inhaling air from the first unit 200 and a plurality of separation means for dividing the air to blow the air to a plurality of discharge units; and the plurality of discharge units for discharging the air introduced into the plurality of blowers and the separation means toward a plurality of areas.

For example, as shown in the drawing, the plurality of discharge units may include a front seat discharge unit 400 and a rear seat discharge unit 500.

The front seat discharge unit 400 includes: a front seat temperature adjusting door 430 and a front seat heating heat exchanger 410 disposed therein; a front seat air outlet 420 for discharging the air passing through the front seat heating heat exchanger 410; and a front seat mode door 450 for opening and closing the front seat air outlet 420. The rear seat discharge unit 500 includes: a rear seat temperature adjusting door 530 and a rear seat heating heat exchanger 510 disposed therein; a rear seat air outlet 520 for discharging the air passing through the rear seat heating heat exchanger 510; and a rear seat mode door 550 for opening and closing the rear seat air outlet 520.

That is, for your better understanding of the present invention, in this embodiment, the number of the discharge units is limited to two, namely, the front seat discharge unit 400 and the rear seat discharge unit 500, but a plurality of discharge units including various discharge paths, namely, the front seat, the rear seat, the central seat, and the lateral surface, may be disposed. In other words, the plurality of discharge units individually include the blowers to respectively blow wind.

In this instance, the plurality blowers disposed at the second unit 300 may be a front seat blower 360 for inhaling air from the first unit 200 and blowing wind to the front seat discharge unit 400, and a second blower 330 for inhaling air from the first unit 200 and blowing wind to the rear seat discharge unit 500, and the separation means 312 divides and blow the wind blown to the front and rear seat discharge units 400 and 500.

Moreover, the separation means 312 are disposed at the rear end of the first unit 200 to divide the cold air passing through the cooling heat exchanger 230 to be individually blown to the plurality of discharge units. That is, the separation means 312 may be a partition wall or a duct for dividing the wind blown to the plurality of discharge units so that the wind is blown selectively. A rear vent 340 may be formed such that the wind flows to the rear seat discharge unit 500 by the separation means 312.

Additionally, a plurality of mode doors may be disposed at one side of the separation means 312 depending on the number of the discharge units in order to individually adjust the amount of air blown to the plurality of discharge units. That is, the plurality of adjusting doors can send cold air as much as needed for the plurality of discharge units.

In detail, a front seat adjusting door 311 is disposed at one side of the front seat blower 360 to adjust the wind introduced into the front seat blower 360, and a rear seat adjusting door 341 is disposed at one side of the rear seat vent 340 to adjust the wind introduced into the second blower 330. Therefore, cold air as much as needed for the front seat discharge unit 400 or the rear seat discharge unit 500 is blown by the front seat adjusting door 311 or the rear seat adjusting door 341.

In addition, when any one among the front seat blower 360 or the second blower 330 is operated, the front seat adjusting door 311 and the rear seat adjusting door 341 can prevent the wind from being flown from the other blower reversely. Therefore, because cold air passing through one first unit 200 having the cooling heat exchanger 230 can be simultaneously or selectively supplied to the plurality of discharge units, the cooling heat exchanger 230 can get the most use of the cooling heat exchanger 230.

Moreover, differently from the conventional air conditioner that indoor air or outdoor air is discharged to the interior of the vehicle after passing through the blower, the evaporator and the heater core in order, in case of the air conditioner according to this embodiment that the blowers 360 and 330 are arranged between the cooling heat exchanger 230 and the heating heat exchangers 410 and 510, the indoor air or the outdoor air is discharged to the interior of the vehicle after passing through the cooling heat exchanger 230, the front seat blower 360 and the front and rear seat heating heat exchangers 410 and 510 in order.

Therefore, the front seat blower 360 blows wind toward the front seat discharge unit 400, and the second blower 330 blows wind toward the rear seat discharge unit 500.

That is, the conventional air conditioner has a problem in that it is difficult to directly control an amount of air introduced into the heater core since the air which passed through the evaporator by one blower passes through the heater core, but the air conditioner for a vehicle according to the present invention can directly control an amount of air passing through the cooling heat exchanger 230 and the front seat and rear seat heating heat exchangers 410 and 510 since the blowers 360 and 330 are arranged between the cooling heat exchanger 230 and the front seat and rear seat heating heat exchangers 410 and 510.

Moreover, differently from the conventional air conditioner that the cooling heat exchanger and the heating heat exchanger occupy a wide space since being arranged in one unit side by side, the air conditioner according to this embodiment of the present invention can utilize the interior space of the vehicle due to a remarkably reduced volume of the air conditioner since the first unit 200 in which the cooling heat exchanger 230 is arranged, the front seat discharge unit 400 in which the front seat heating heat exchanger 410 is arranged, and the rear seat discharge unit 500 in which the rear seat heating heat exchanger 510 is arranged are distinct from one another.

In this instance, the cooling heat exchanger 230 is arranged in the first unit 200, and the air inlet 220 including the indoor air inlet 210, which is an inlet for inhaling indoor air of the vehicle, or the outdoor air inlet 211, which is an inlet for inhaling outdoor air of the vehicle, is formed at one side of the first unit 200. An indoor and outdoor air door (not shown) for selectively introducing indoor air or outdoor air may be disposed at one side of the air inlet 220.

Furthermore, the first unit 200 has an air filter 240 disposed between the air inlet 220 and the cooling heat exchanger 230 in order to remove foreign matters. Additionally, because the cooling heat exchanger 230 is arranged in the first unit 200, condensate water discharge hole (not shown) may be disposed on the bottom of the first unit 200 to prevent leakage of condensate water dropping from the cooling heat exchanger 230 and to drain the condensate water to the outside smoothly.

The blowers 360 and 330 are disposed in the second unit 300 in order to blow the air introduced from the first unit 200 to the front seat discharge unit 400 and the rear seat discharge unit 500. In this instance, a controller (not shown) can directly control an amount of air blown to the discharge units 400 and 500.

The blowers 360 and 330 of the second unit 300 may be a scroll case in which a blast fan for forcedly blowing air toward the discharge units 400 and 500 is mounted. That is, the blowers 360 and 330 have the same structure as the conventional blower, but are arranged between the first unit 200 and the discharge units 400 and 500 in the present invention.

First, the air introduced into the air inlet 220 of the first unit 200 by the blowers 360 and 330 of the second unit 300 is blown to the second unit 300 after passing through the cooling heat exchanger 230. The blowers 360 and 330 of the second unit 300 blow wind toward the discharge units 400 and 500.

Additionally, in the present invention, the discharge units are limited to the front seat discharge unit 400 and the rear seat discharge unit 500, but a plurality of discharge units including the front seat discharge unit 400 and the rear seat discharge unit 500 can discharge the air to a plurality of areas. In this instance, the air introduced from the air inlet 220 of the first unit 200 can be discharged to the plurality of discharge units by the blowers of the second unit 300. In this instance, a plurality of discharge ducts are disposed to communicate with the second unit 300, and the heating heat exchanger may be disposed at the plurality of areas. After that, the air inhaled to the second unit 300 may be discharged to the interior of the vehicle after passing through the heat exchanger selectively disposed in the plurality of areas. That is, because the above structure makes it possible to individually perform temperature adjustment, cooling and heating modes, and air volume adjustment in the plurality of areas, the effects may be maximized in the autonomous vehicle.

In this invention, the heating heat exchangers 410 and 510 are disposed in the discharge units, but the heating heat exchangers may be heater cores for emitting heat or may be PTC heaters which will be described later. Likewise, the cooling heat exchangers may be evaporators for absorbing heat by refrigerant circulating in the vehicle.

For instance, the front seat and rear seat heating heat exchangers 410 and 510 may be PTC heaters (Positive Temperature Coefficient heaters), and a heater control unit 900 disposed at one side of the vehicle directly controls duty of the front seat and rear seat heating heat exchangers 410 and 510 which are the PTC heaters in order to adjust temperature of the air discharged to the front and rear seat air outlets 420 and 520. Therefore, the heater control unit 900 directly controls the front seat and rear seat heating heat exchangers 410 and 510, which are the PTC heaters, without the front seat and rear seat right and left temperature adjusting doors 430 and 530, which were disposed at the front end of the front seat and rear seat heating heat exchangers 410 and 510.

Meanwhile, the rear seat vent 340 is arranged at the floor of the interior of the vehicle, and an auxiliary indoor air intake 370 is formed at one side of the rear seat vent 340. Therefore, in the heating mode, when the auxiliary indoor air intake 370 is opened, because the air in the interior of the vehicle directly goes to the rear seat heating heat exchanger 510 without passing through the cooling heat exchanger 230, the interior of the vehicle can be heated rapidly.

Figure 8:
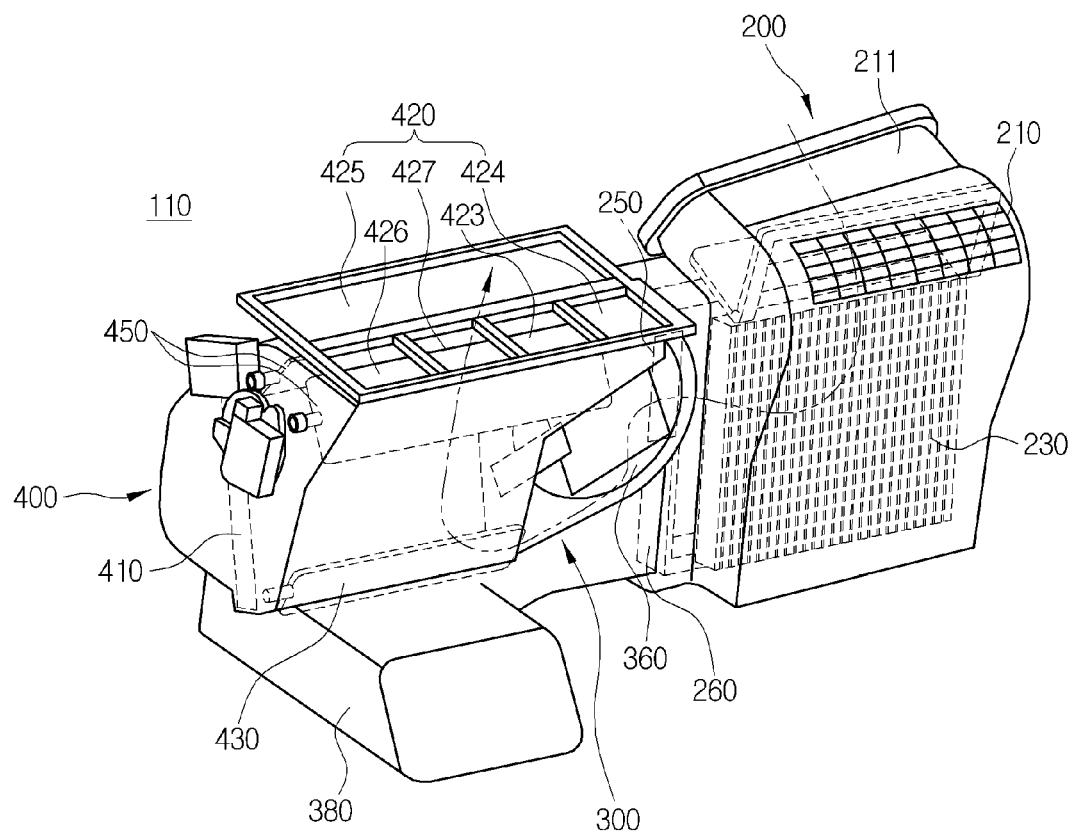
FIG. 8 is a perspective view showing the air conditioner for a vehicle of FIG. 7.

FIG. 8 is a perspective view showing the air conditioner for a vehicle of FIG. 7.

As shown in FIG. 8, the air conditioner 100 for a vehicle according to the present invention includes an air-conditioning case 110 embedded in a dash panel of the vehicle. In this instance, the air-conditioning case 110 includes the first unit 200, the front seat blower 360 of the second unit 300 and the front seat discharge unit 400.

As described above, the first unit 200 includes the indoor and outdoor air inlet 220 having the indoor air inlet 210 and the outdoor air inlet 211, and the cooling heat exchanger 230 disposed therein, and is communicated with the front seat blower 360 of the second unit 300. Moreover, the front seat discharge unit 400 includes the front seat heating heat exchanger 410 disposed therein to communicate with the second unit 300 and the front seat air outlet 420 for discharging the air passing through the front seat heating heat exchanger 410. That is the air-conditioning case 110 is formed in such a way that the first unit 200, the front seat blower 360 of the second unit 300, and the front seat discharge unit 400 are combined with one another in order to communicate to one another.

That is, differently from the conventional air conditioner that the air is discharged to the interior of the vehicle after passing through the blower unit, the evaporator and the heater core in order, the air conditioner according to the present invention is characterized in that the front seat blower 360 is arranged between the cooling heat exchanger 230 and the front seat heating heat exchanger 410 and the indoor air or the outdoor air passes through the cooling heat exchanger, the blower and the front seat heating heat exchanger in order. The cooling heat exchanger 230 and the front seat heating heat exchanger 410 are not arranged in one unit in the air-conditioning case 110 embedded in the dash panel of the vehicle, but are respectively arranged in different units. Therefore, the air conditioner for a vehicle according to the present invention can secure the interior space of the vehicle more since the volume of the air-conditioning case 110 is reduced remarkably, and allow the passenger to utilize the interior space of the vehicle. In this instance, the cooling heat exchanger 230 arranged in the first unit 200 is arranged vertically so as to reduce the entire thickness of the air-conditioning case 110.

In other words, because the first unit 200, the front seat blower 360 of the second unit 300 and the front seat discharge unit 400 are combined with one another in order along the width of the dash panel in a vehicle width direction to communicate with one another, the air conditioner for a vehicle according to the present invention can secure the interior space of the vehicle more. Therefore, the air conditioner for a vehicle according to the present invention is suitable for autonomous vehicles requiring a wide front seat space in which a heating sheet can be rotated or moved to face the rear side.

In this instance, the first unit 200 includes a first exit 250 communicating with the second unit 300 and a second exit 260 communicating with a rear seat outlet 380. The second exit 260 is formed at a lower end of the first exit 250 and communicates with the rear seat outlet 380, and the rear seat outlet 380 passes a lower portion of the front seat discharge unit 400 and is combined with the rear seat vent 340 extending to the floor of the vehicle.

The second unit 300 includes the front seat blower 360 disposed therein to blow the air introduced into the first exit 250 of the first unit 200 to the front seat discharge unit 400. In this instance, the controller (not shown) can directly control an amount of the air blowing to the front seat discharge unit 400. Moreover, the front seat blower 360 has the same structure as the conventional blower, is arranged between the first unit 200 and the front seat discharge unit 400 to be vertically erect to secure the interior space.

Therefore, because the front seat blower 360 is arranged to be erect in the second unit 300, the air supplied from the first exit 250 is introduced in a perpendicular direction, and then, flows toward the front seat discharge unit 40 in the perpendicular direction again. In this instance, the air in the interior of the vehicle introduced through the indoor air inlet 210 is supplied to the first exit 250 through the cooling heat exchanger 230.

The front seat discharge unit 400 communicates with the second unit 300 so that the indoor air or the outdoor air controlled in the amount of air by the front seat blower 360 is introduced through the first exit 250. Furthermore, the front seat discharge unit 400 includes a plurality of front seat air outlets 420 formed at one side thereof, an air passageway formed therein to communicate with the front seat air outlets 420, a front seat heating heat exchanger 410, and a front seat temperature adjusting door 430 for adjusting the degree of opening of a passageway passing the front seat heating heat exchanger 410.

In this instance, the front seat air outlets 420 of the air-conditioning case 110 include a defrost outlet 425 disposed toward the front of the vehicle, and a left side outlet 426, a left roof outlet 427, a right roof outlet 423, and a right side outlet 424 which are disposed toward the rear of the vehicle in order and are adjacent to the defrost outlet 425. The air blown from the second unit 300 passes through the front seat heating heat exchanger 410 by the temperature adjusting door 430, and then, is discharged to the front seat air outlets 420. Additionally, front seat mode doors 450 may be mounted at one side of each front seat air outlet 420 in order to determine an amount of air discharged to vents connected with the front seat air outlets 420 or to selectively distribute the air.

Figure 9:
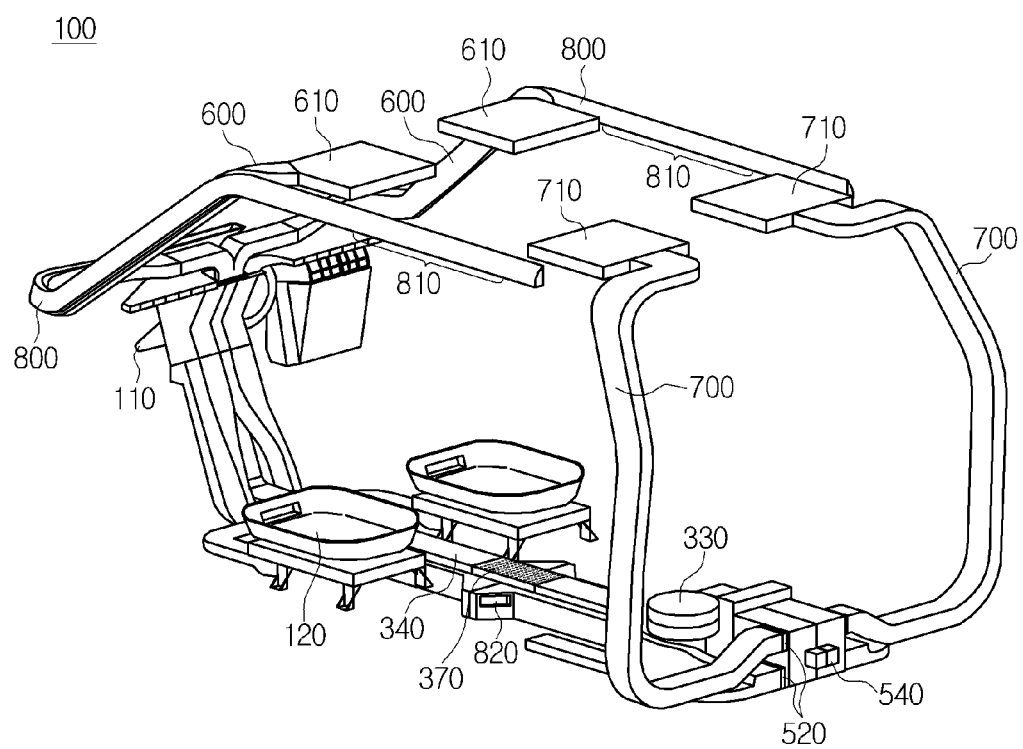
FIG. 9 is a perspective view showing an air-conditioning case and a roof vent connected to the air-conditioning case.
Figure 10:
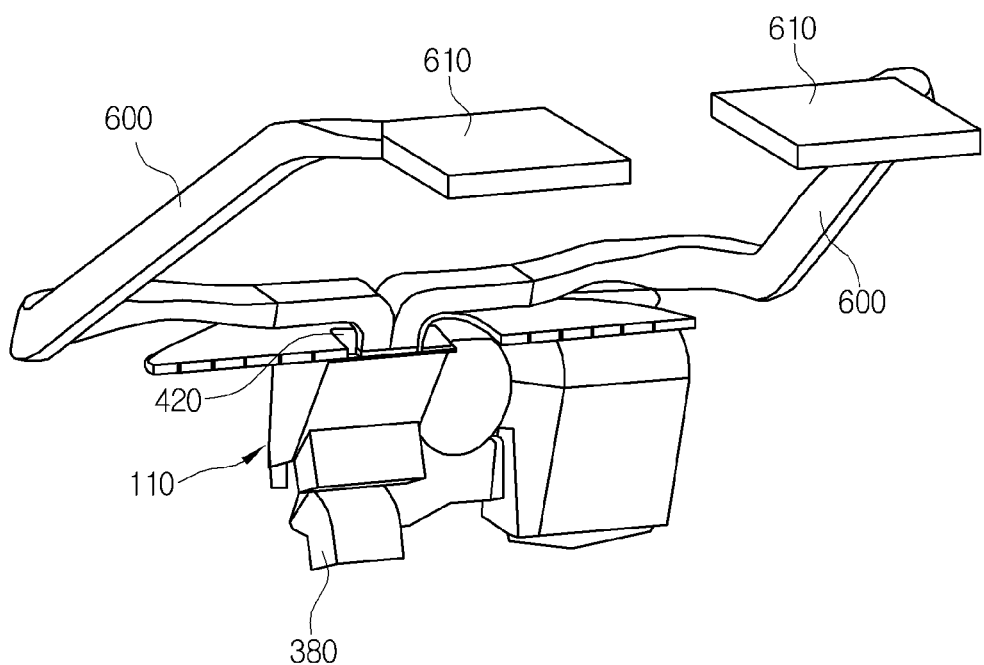
FIG. 10 is a perspective view showing the entire appearance of the air conditioner for a vehicle according to the preferred embodiment of the present invention.
Figure 11:
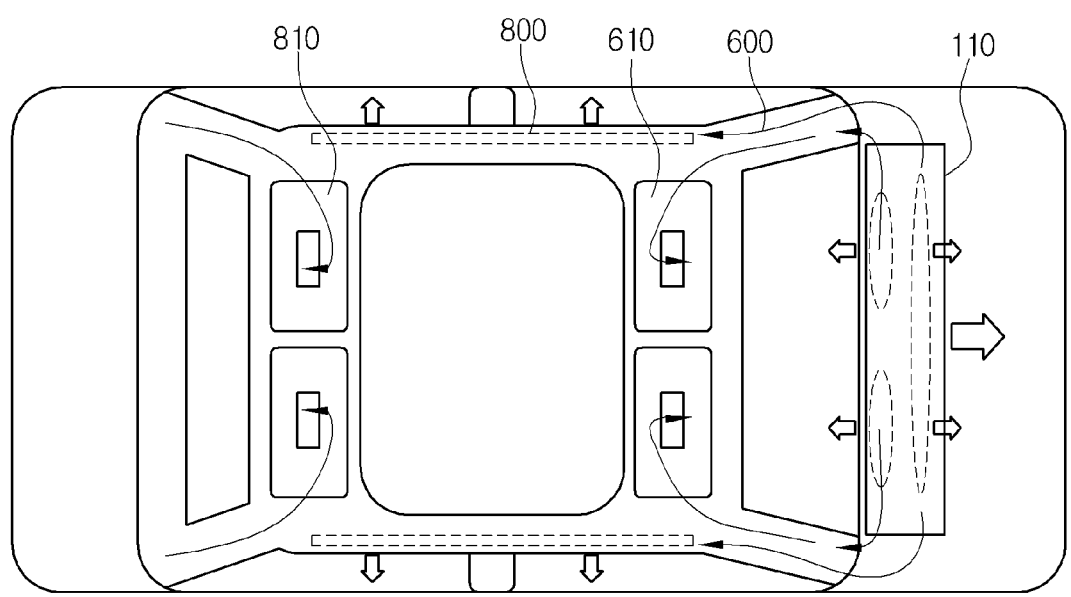
FIG. 11 is a perspective view showing the air conditioner of FIG. 10 is arranged on the roof of the vehicle.

FIG. 9 is a perspective view showing an air-conditioning case and a roof vent connected to the air-conditioning case, FIG. 10 is a perspective view showing the entire appearance of the air conditioner for a vehicle according to the preferred embodiment of the present invention, and FIG. 11 is a perspective view showing the air conditioner of FIG. 10 is arranged on the roof of the vehicle.

As shown in FIGS. 9 and 10, the air conditioner 100 for a vehicle includes: a roof vent 600 communicating with the air-conditioning case 110, extending to the roof of the vehicle after passing through a front filler of the vehicle, and having a roof outlet 610 for discharging air above the front seat sheet 120; a rear vent 340 communicating with the air-conditioning case 110 and arranged along the floor of the vehicle; a rear seat roof vent 700 communicating with the rear seat vent 340, extending to the roof of the vehicle after passing through a rear filler of the vehicle, and having a rear seat roof outlet 710 for discharging air above the rear seat sheet 130; and a defrost vent 800 communicating with the air-conditioning case 110 and having a defrost outlet 810 for discharging air after passing through the front filler of the vehicle to defrost side windows of the vehicle.

The air conditioner 100 for a vehicle according to the present invention is suitable for autonomous vehicles requiring a wide front seat space in which a heating sheet can be rotated or moved to face the rear side. When the front seat sheet 120 faces the front side, cold and warm air is discharged to the passenger's front side from the front seat outlet communicated with the side outlets 426 and 424 of the air-conditioning case 110. When the front seat sheet 120 faces the rear side, cold and warm air is discharged above the passenger from the roof outlet 610 of the roof vent 600 communicating with the roof outlets 428 and 423 of the air-conditioning case 110.

The above is achieved considering that a passenger who is sitting on the front seat may see the rear side during unmanned driving of the autonomous vehicle. When a sensor (not shown) disposed at one side of the front seat sheet 120 senses rotation or movement of the front seat sheet 120, the controller can automatically convert a front side discharge mode or a rear side discharge mode according to the direction (passenger's sitting direction) of the front seat sheet 120. The sensor may be one among various well-known methods, such as an infrared sensor, and it does not limit the present invention.

Furthermore, in case of the autonomous vehicle, it is important to defrost side windows since the passenger sitting on the front seat sheet 120 sees the side window rather than a front window of the vehicle when the front seat sheet 120 faces the rear side. Therefore, the defrost vent 800 includes the defrost outlet 810 arranged along the boundary between the roof and the side window and communicated with the defrost outlet 425 of the air-conditioning case 110 to discharge air in order to defrost the side windows of the vehicle.

In the meantime, the air conditioner according to the present invention may further include a central outlet 820 communicated with the rear seat air outlet 520 and formed in the floor of the vehicle between the front seat sheet 120 and the rear seat sheet 130. The central outlet 820 discharges cold and warm air toward the passenger's feet sitting on the front seat sheet 120 and/or the rear seat sheet 130 when the front seat sheet 120 faces the rear side.

The rear seat sheet 130 is arranged at the rear side of the front seat sheet 120. In the drawings, two arrays of the front seat and the rear seat are illustrated, but three arrays may be arranged. Additionally, three or more arrays of the discharge units including the front seat discharge unit 400 may be formed to independently perform air-conditioning in the plurality of areas.

Meanwhile, the controller (not shown) can distinguish whether or not the passenger sits on the front seat sheet 120 and/or the rear seat sheet 130 through the sensor.

In this instance, it is determined that the passenger is sitting on the front seat sheet 120, the controller operates the front seat blower 360 and opens the front seat adjusting door 311. Therefore, the air introduced from the indoor and outdoor air inlet 220 flows to the front seat discharge unit 400 after passing through the front seat blower 360.

Moreover, when the front seat sheet 120 faces the front side, the controller opens the front seat mode door 450 to discharge the air to the side outlets 426 and 424 so that cold air or warm air can be discharged to the front seat passenger's front. On the contrary, when the front seat sheet 120 faces the rear side, the controller opens the front seat mode door 450 to discharge the air to the roof outlets 427 and 423 so that cold air or warm air can be discharged above the front seat passenger.

If it is determined that there is a passenger sitting on the rear seat sheet 130, the controller operates the second blower 330 and opens the rear seat adjusting door 341. Therefore, the air introduced from the indoor and outdoor air inlet 220 flows to the rear seat discharge unit 500 after passing through the second blower 330.

In order to discharge bad smell generated from the cooling heat exchanger 230 and to ventilate the interior of the vehicle, it is necessary to rapidly discharge the indoor air of the vehicle and the air passing through the air conditioner to the outside rapidly.

Figure 12:
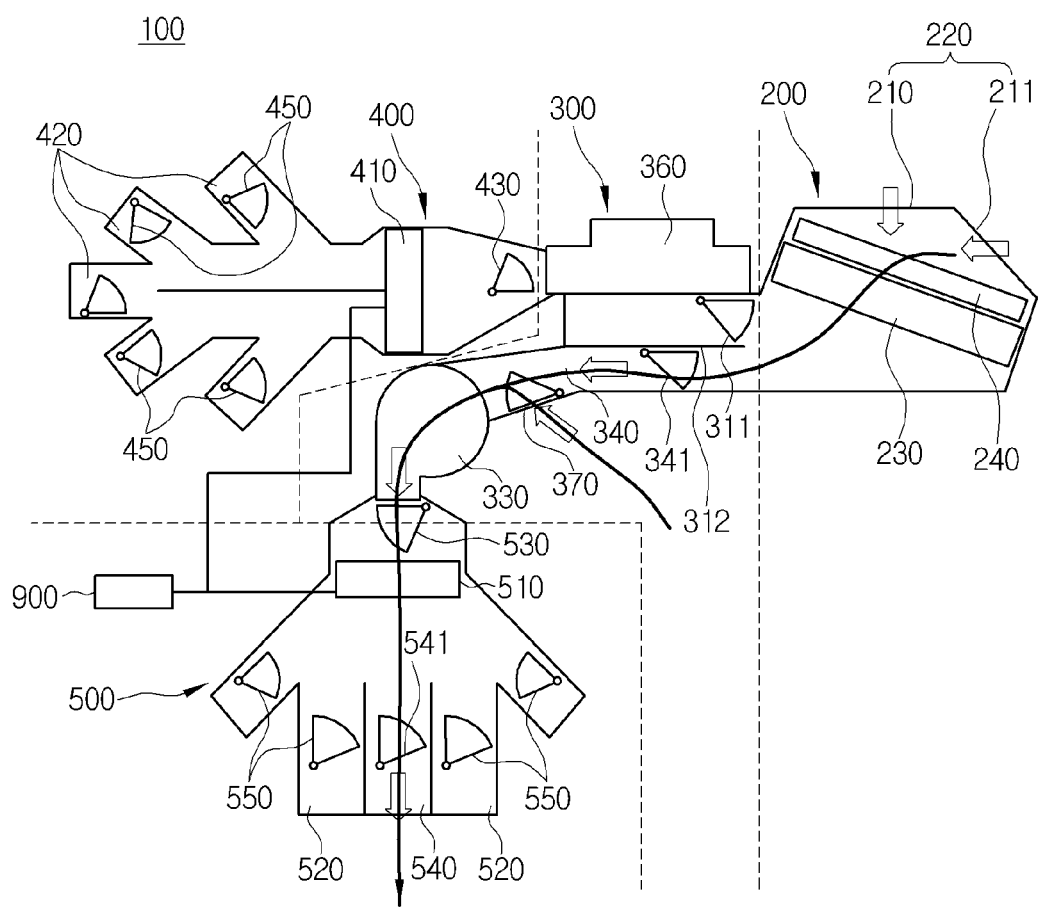
FIG. 12 is a schematic diagram showing an air conditioner for a vehicle according to a seventh preferred embodiment of the present invention.
Figure 13:
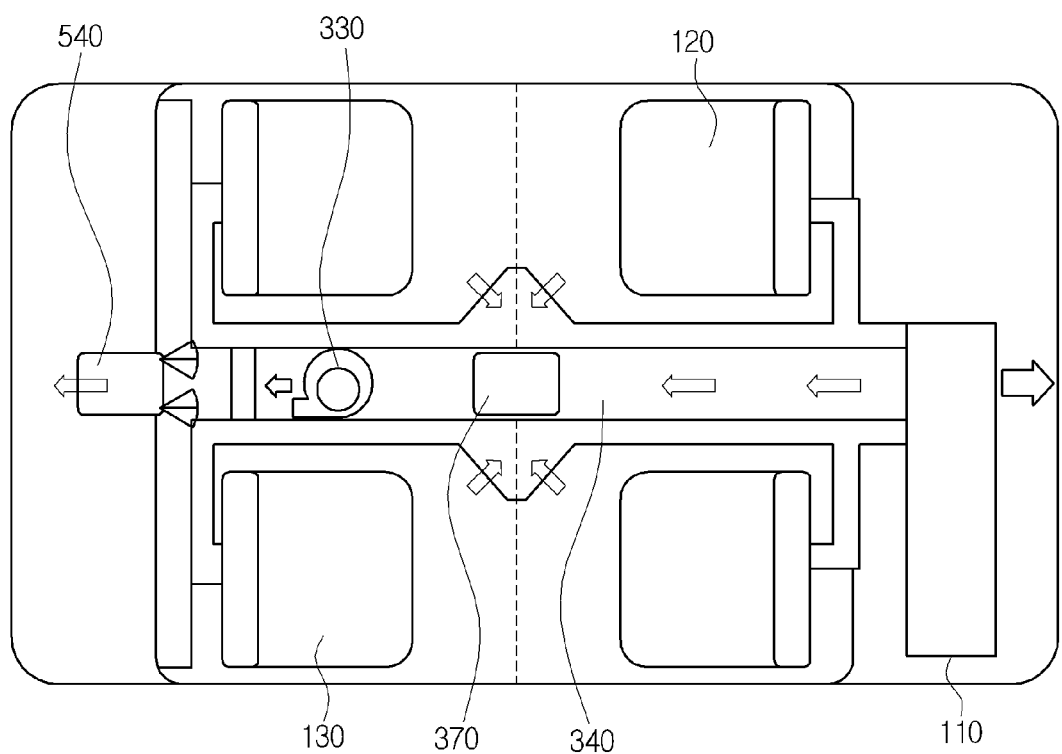
FIG. 13 is a perspective view showing the air conditioner of FIG. 10 is arranged on the floor of the vehicle.

FIG. 12 is a schematic diagram showing an air conditioner for a vehicle according to a seventh preferred embodiment of the present invention, and FIG. 13 is a perspective view showing the air conditioner of FIG. 10 is arranged on the floor of the vehicle.

Referring to FIGS. 9, 12 and 13, the air conditioner for a vehicle according to the present invention further includes a discharge hole 540 formed at the rear side of the vehicle to discharge the air to the outside of the vehicle. That is, the air conditioner can discharge the air in the interior of the vehicle introduced into the auxiliary indoor air intake 370 and the bad smell generated from the inside of the cooling heat exchanger 230 or the air-conditioning case 110 to the outside of the vehicle through the discharge hole 540, and it will be described in detail as follows.

The auxiliary indoor air intake 370 is formed at the rear seat vent 340 arranged at the floor of the vehicle, and is arranged at the center of the vehicle. Preferably, the auxiliary indoor air intake 370 is formed between the front seat sheet 120 and the rear seat sheet 130, and more preferably, between the front seat blower 360 and the second blower 330. Furthermore, the discharge hole 540 is formed in the rear seat discharge unit 500, and discharges the air passing the second blower 330 to the outside of the vehicle. An opening and closing door 541 for opening and closing the discharge hole 540 is disposed at one side of the discharge hole 540.

In this instance, as shown in FIG. 12, the front seat adjusting door 311 is closed to block the air flowing toward the front seat discharge unit 400, the rear seat adjusting door 341 is opened to make the air flow toward the rear seat discharge unit 500, and the second blower 330 is operated to the maximum. Additionally, when the rear seat air outlet 520 is closed, the outside air of the vehicle passes through the cooling heat exchanger 230 through the outdoor air inlet 211, and is mixed with the inside air of the vehicle through the auxiliary indoor air intake 370 and is discharged to the outside of the vehicle through the discharge hole 540.

As shown in FIG. 13, the auxiliary indoor air intake 370 is formed at the center of the vehicle to rapidly absorb the indoor air of the vehicle. When the second blower 330 is operated to the maximum, the outdoor air of the vehicle can be discharged to the outside of the vehicle after passing through the air-conditioning case. Therefore, at the time of the initial starting of the vehicle, only the second blower 330 is operated to the maximum for five to ten seconds in order to discharge the initial unpleasant smell to the outside.

Finally, in order to rapidly discharge the indoor air of the vehicle to the outside of the vehicle to ventilate the interior of the vehicle, the opening and closing door 541 is opened, the indoor air of the vehicle is inhaled through the indoor and outdoor air inlet 220 or the auxiliary indoor air intake 370, so that the air can be discharged to the outside of the vehicle through the discharge hole 540.

Additionally, because the front seat adjusting door 311, the front seat air outlet 420, and the rear seat air outlet 540 are closed and the rear seat adjusting door 341 is opened, the air passageway toward the front seat is blocked, and the indoor air of the vehicle introduced from the indoor air inlet 210 of the indoor and outdoor air inlet 220 through the rear seat vent 340 is discharged to the outside through the discharge hole 540 disposed at the rear of the vehicle. In this instance, when the auxiliary indoor air intake 370 located at the center of the vehicle is opened, the indoor air can be discharged through the discharge hole 540 together with the inside air of the vehicle introduced from the indoor air inlet 210.

The front seat mode door 450 together with the front seat adjusting door 311 closes the front seat air outlet 420, and the rear seat mode door 550 closes the rear seat air outlet 520 in order to perfectly block introduction of air into the interior of the vehicle.

Moreover, in order to remove the smell of the cooling heat exchanger 230, which serves as an evaporator, if ventilation of the cooling heat exchanger 230 is needed, the opening and closing door 541 is opened to inhale indoor air or outdoor air of the vehicle through the indoor and outdoor air inlet 220 so that the air can be discharged to the outside of the vehicle through the discharge hole 540 after passing through the cooling heat exchanger 230.

In this instance, because the front seat adjusting door 311, the front seat air outlet 420 and the rear seat air outlet 520 are closed and the rear seat adjusting door 341 is opened, the air passageway toward the front seat is blocked to block introduction of unpleasant smell, and the indoor air of the vehicle introduced from the indoor air inlet 210 of the indoor and outdoor air inlet 220 through the rear seat vent 340 is discharged to the outside through the discharge hole 540 disposed at the rear of the vehicle. In this instance, the auxiliary indoor air intake 370 located at the center of the vehicle is blocked to prevent introduction of the unpleasant smell, and the front seat mode door 450 closes the front seat air outlet 420 and the rear seat mode door 550 closes the rear seat air outlet 520 in order to perfectly prevent introduction of air into the interior of the vehicle.

What is claimed is:

1. An air conditioner for a vehicle for providing an individual air conditioning effect in a plurality of areas of the vehicle, comprising:
    a first unit equipped with an air inlet and a cooling heat exchanger;
    a second unit configured to communicate with the first unit and having a blower disposed therein;
    a front seat discharge unit that is distinguished from the first unit, and configured to communicate with the second unit, and having a front seat heating heat exchanger disposed therein and a front seat air outlet for discharging the air passing through the front seat heating heat exchanger; and
    a rear seat discharge unit that is distinguished from the first unit, and configured to communicate with the second unit, and having a rear seat heating heat exchanger disposed therein and a rear seat air outlet for discharging the air passing through the rear seat heating heat exchanger;
    wherein air introduced into the air inlet is discharged to a front seat right temperature adjusting door through the front seat heating heat exchanger or discharged to a rear seat right temperature adjusting door through the rear seat heating heat exchanger after passing through the cooling heat exchanger and the blower;
    wherein the front seat discharge unit further includes a front seat left outlet and a front seat right outlet for discharging air to the interior of the vehicle, a front seat left temperature adjusting door disposed at a first side of the front seat heating heat exchanger to adjust a temperature of air discharged to the front seat left outlet, and a front seat right temperature adjusting door disposed at a second side opposite the first side of the front seat heating heat exchanger to adjust a temperature of air discharged to the front seat right outlet
    wherein the rear seat discharge unit includes a rear seat left outlet and a rear seat right outlet for discharging air to the interior of the vehicle, a rear seat left temperature adjusting door disposed at a first side of the rear seat heating heat exchanger to adjust a temperature of air discharged to the rear seat left outlet, and a rear seat right temperature adjusting door disposed at a second side of the rear seat heating heat exchanger to adjust a temperature of air discharged to the rear seat right outlet and
    wherein the second unit further includes an air blast adjusting door for controlling air selectively blown to the front seat discharge unit or the rear seat discharge unit.

2. The air conditioner according to claim 1, further including partition wall for dividing the air blown to the front seat discharge unit and the rear seat discharge unit.

3. The air conditioner according to claim 1, wherein the air inlet of the first unit includes an indoor air inlet which is an inlet for inhaling indoor air of the vehicle, an outdoor air inlet which is an inlet for inhaling outdoor air of the vehicle, and an indoor and outdoor air door disposed at one side to selectively introduce the indoor air or the outdoor air of the vehicle.

4. The air conditioner according to claim 1, wherein a plurality of the blowers are disposed corresponding to the discharge units to blow air to the discharge units.

5. The air conditioner according to claim 4, wherein the plurality of discharge units include:

a front seat discharge unit having a front seat heating heat exchanger disposed therein and a front seat air outlet for discharging the air passing through the front seat heating heat exchanger;

a rear seat discharge unit having a rear seat heating heat exchanger disposed therein and a rear seat air outlet for discharging the air passing through the rear seat heating heat exchanger;

a blower for inhaling air from the first unit and blowing wind to the front seat discharge unit; and a second blower for inhaling air from the first unit and blowing wind to the rear seat discharge unit.

6. The air conditioner according to claim 5, wherein a front seat adjusting door is disposed at one side of the blower to block the wind introduced into the blower.

7. The air conditioner according to claim 6, wherein the rear seat vent is arranged at the floor of the interior of the vehicle, and an indoor air intake is formed at one side thereof.

8. The air conditioner according to claim 5, wherein the front seat discharge unit includes:

a front seat left outlet and a front seat right outlet for discharging wind to the interior of the vehicle;

a front seat left temperature adjusting door disposed at one side of the front seat heating heat exchanger to adjust temperature of wind discharged to the front seat left outlet; and a front seat right temperature adjusting door disposed at one side of the front seat heating heat exchanger to adjust temperature of wind discharged to the front seat right outlet.

9. The air conditioner according to claim 5, wherein the rear seat discharge unit includes:

a rear seat left outlet and a rear seat right outlet for discharging wind to the interior of the vehicle;

a rear seat left temperature adjusting door disposed at one side of the rear seat heating heat exchanger to adjust temperature of wind discharged to the rear seat left outlet; and a rear seat right temperature adjusting door disposed at one side of the rear seat heating heat exchanger to adjust temperature of wind discharged to the rear seat right outlet.

10. The air conditioner according to claim 5, further comprising a communication vent which makes the wind passing through the blower pass through the rear seat discharge unit.

11. The air conditioner according to claim 10, wherein the communication vent includes a communication vent door for adjusting the degree of opening of the communication vent.

* * * * *